United States Patent [19]

Langford et al.

[11] 3,969,630

[45] July 13, 1976

[54] METHOD AND APPARATUS FOR DEFINING RADIATION-OPAQUE PATHWAYS WITHIN SHIELDING MATERIALS

[75] Inventors: Obie M. Langford; Michael Bagnasco, both of Houston, Tex.

[73] Assignee: Texaco Inc., New York, N.Y.

[22] Filed: Oct. 21, 1974

[21] Appl. No.: 516,340

[52] U.S. Cl............................... 250/515; 250/253; 250/269
[51] Int. Cl.²........................................... G01V 5/00
[58] Field of Search ........... 250/515, 517, 518, 270, 250/253, 256, 269

[56] References Cited
UNITED STATES PATENTS

| | | | |
|---|---|---|---|
| 2,716,705 | 8/1955 | Zinn.................................... | 250/518 |
| 2,719,823 | 10/1955 | Zinn.................................... | 250/518 X |
| 3,127,512 | 3/1964 | Monaghan......................... | 250/270 |
| 3,132,998 | 5/1964 | Long et al......................... | 250/518 X |

FOREIGN PATENTS OR APPLICATIONS 990,328  4/1965  United Kingdom................. 250/515

*Primary Examiner*—Archie R. Borchelt
*Attorney, Agent, or Firm*—T. H. Whaley; C. G. Ries; William J. Beard

[57] ABSTRACT

Disclosed is a method and apparatus for providing pathways for electrical conductors and conduits through radiation shielding without effectively diminishing the degree of shielding. A pathway is formed by providing a helical groove on the surface of a cylindrical shielding member which is fitted with close tolerance inside a tubular housing. Specific embodiments provide for the passage of electrical conductors through a cylinder of shielding material positioned within a well logging sonde between a radiation source and a radiation detector. One or more grooves may be provided in the shielding member. The shielding member may be constructed of two or more individual, coaxially aligned, abutting, cylindrical shielding submembers. The shielding submembers making up a shielding member may be of the same or different shielding material.

8 Claims, 4 Drawing Figures

METHOD AND APPARATUS FOR DEFINING RADIATION-OPAQUE PATHWAYS WITHIN SHIELDING MATERIALS

BACKGROUND OF THE INVENTION

1. Field of the Invention

The present invention pertains generally to the leak-free passage of electrical conductors and conduits through radiation shielding. More specifically, the invention pertains to radiation-opaque pathways for electrical conductors in the shielding between the radiation source and the radiation detector in a well logging sonde.

2. Description of the Prior Art

In nuclear experiments, shielding material is used between the radiation source and the radiation detector to prevent neutrons and gamma rays from advancing directly into the detector from the source. In nuclear well logging sonde applications, shielding becomes critical due to the restricted space available within the well bore. A typical well logging sonde has a tubular housing approximately 6 meters long and 11 centimeters in diameter. The sonde carries both the source and the detector. The source-to-detector space available for shielding is between about 31 centimeters to about 69 centimeters, depending on the particular application. Consequently, in a practical application, adequate shielding to prevent all neutron or gamma ray leakage to the detector is prohibited. This problem of nuclear leakage is amplified in a typical sonde since the electrical conductors for power and control circuits must pass through the shielding material. Any straight hole in, or bypass of, the shielding material provides a path for radiation leakage, increasing the background radiation reaching the detector and thus reducing the accuracy of the data obtained. It is also the case that, even where the space for shielding is ample, drilling a long, small diameter hole, more than about sixty centimeters in length, through the shielding material to provide a passageway may be very difficult.

SUMMARY OF THE INVENTION

A cylinder of shielding material is provided with a helical groove in the curved surface of the cylinder. The groove runs the entire length of the cylinder while winding completely around the cylinder to form a helical path. The shielding member thus formed is inserted with close tolerance into a sleeve. In a well logging application, the sleeve is the tubular housing of the sonde. The groove, which is thus enclosed by the interior wall of the housing, forms a continuous pathway from the region, or cavity within the housing, on one side of the shielding member to the region, or cavity within the housing, on the other side of the shielding member. Since the groove is helical, there is no straight-line path for neutrons or gamma rays to bypass the shielding member unimpeded by the shielding material.

An electrical conductor, or a conduit to carry fluids for cooling, lubrication, etc., may be placed within the groove before the shielding member is positioned within the housing. The conductor or conduit extends axially beyond the shielding member at both ends to connect to appropriate instrumentation, controls or other means on each end of the shield.

The width and depth of the groove can be varied to accommodate different sizes of conductors or conduits. Multiple grooves may also be provided to accommodate more than one conductor and/or conduit.

The pitch of the helical groove, or grooves, may be varied, but is preferably chosen such that the amount of shielding material present in the shielding member along its entire length is cylindrically symmetric about the central axis of the shielding member. In such a design, any two straight line paths through the shielding, parallel to and equally spaced from the shielding axis, pass through the same amount of shielding material.

The shielding member may be constructed by joining two or more similarly designed shielding members, or submembers, having a common central axis. This can be done to facilitate construction of a long shielding member, and/or to permit combining specific submembers composed of different shielding materials for special applications.

While the preferred form of the shielding member is a right circular cylinder, where the need arises in a given application of the present invention, the method and use of an essentially helical groove can be used in conjunction with any shape of shielding device without departing from the spirit of the invention.

By forming the pathway on the external surface of the shielding member, conventional and simple fabrication techniques may be employed to reduce the cost of the shield. Drilling and other more complex machining operations are eliminated so that shields of any desired length may be quickly and efficiently fabricated.

Other features, objects and advantages of the invention will become more readily apparent from the accompanying drawings, specification and claims.

DESCRIPTION OF THE ILLUSTRATED EMBODIMENTS

Figure 1:
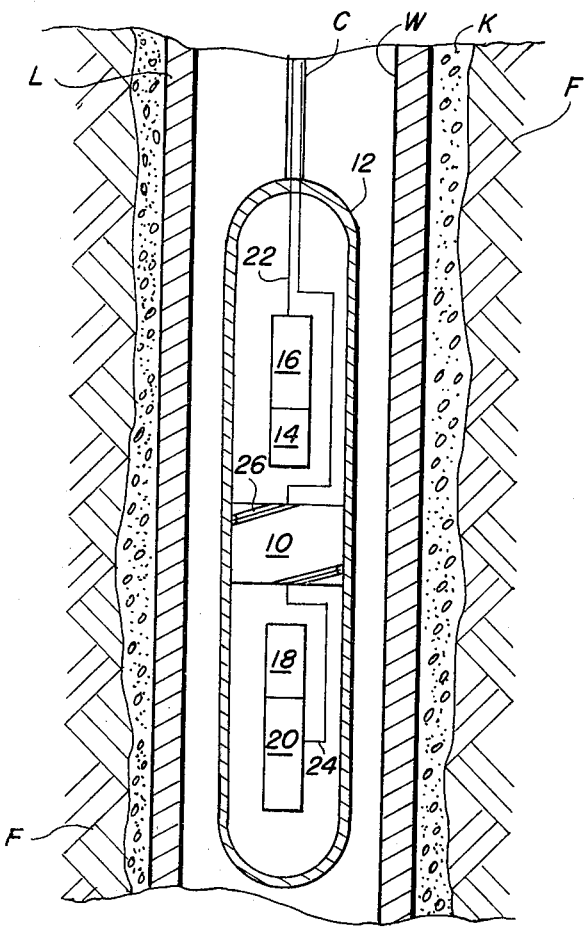
FIG. 1 is a schematic sectional elevation of a nuclear well logging sonde showing radiation shielding according to the invention.

A shielding device or member according to the present invention is shown at 10 in FIG. 1, fitted within the tubular housing 12 of a well logging sonde, which is suspended in a well W by an armored well logging cable C. The well W is depicted passing through a formation F, and lined with well casing L, which is fixed in the well with cement K. The shielding 10 separates a radiation detector in the form of a scintillation crystal 14, optically joined to a photomultiplier tube and associated electronics 16, from a neutron generator 18 and its power supply 20.

The photomultiplier tube and associated electronics 16 are connected by line 22 to appropriate instrumentation at the surface (not shown) to analyze and record data. Similarly, the neutron generator power supply 20 is controlled from the surface through line 24. Both electrical connections 22 and 24 are integrated in the cable C. The line 24 passes from the neutron generator side of the shield 10 to the radiation detector side by travelling along the groove 26 in the curved surface of the cylindrical shield 10. It will be appreciated that the instrumentation to generate and detect the desired radiation, as well as the electrical connection to the surface, is described symbolically with respect to FIG. 1.

Figure 2:
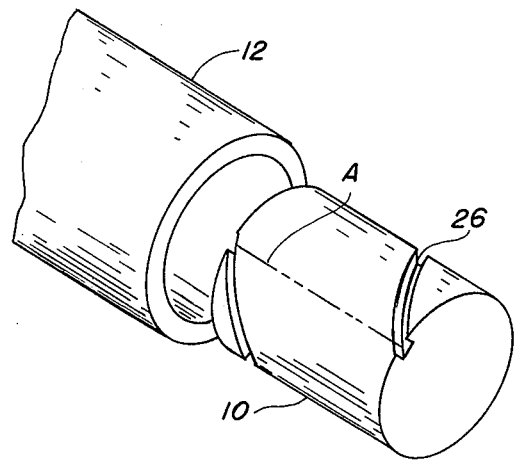
FIG. 2 is a perspective view of a single-groove shielding member and a portion or a sonde housing constructed in accordance with the teachings of this invention.

Fig. 2 shows the shielding device 10 with the helically extensive groove 26, and a segment of the sonde housing 12. A broken line A is added to the shield 10 to illustrate that the groove 26 makes one complete revolution of the cylindrical shield, that is, the pitch of the helical groove is equal to the length of the shielding member. Since the groove 26 itself represents the absence of a corresponding amount of the material of which the shielding member 10 is composed, making the pitch of the groove equal to the length of the shield ensures that the absence of the shielding material is uniformly distributed around the periphery of the cylindrical shield. Thus, the degree of shielding between the neutron generator 18 and the detector 14 is cylindrically symmetric about the common axis of the generator, the shielding member 10, and the detector. It will be appreciated that this cylindrical symmetry may also be obtained by constructing the groove 26 so that the length of the shielding member 10 is any integer multiple of the groove pitch; however, the amount of shielding material lacking because of the groove is proportional to the integer so that the higher the integer, i.e., the smaller the pitch value, the less shielding material present. Consequently, for maximum shielding effect, the integer should be one.

The same uniformity of peripheral shielding provided by setting the length of the shielding member 10 equal to an integer multiple of the groove pitch may also be effected where the pitch of the groove is variable. For example, if the groove pitch is larger in one half of the shielding member 10 than in the other, the amount of shielding material which is absent from the shield surface is essentially the same all the way around the shield, as long as the groove 26 goes around the cylindrical shield an integral number of times.

The width and depth of the groove 26 are determined by the thickness of the conductor or conduit to be placed in the groove. This conductor or conduit should not protrude above the sides of the groove 26. The shielding member 10, with the conductor or conduit placed in the groove 26 as shown in FIG. 1, is then placed within the sonde housing 12. The diameter of the shielding member 10 is essentially the same as the inside diameter of the sonde housing 12 to provide a close fit between these two elements. The conductor or conduit contained in the groove 26 is thus enclosed on three sides by the shielding member 10, and on the fourth side by the sonde housing 12.

Figure 4:
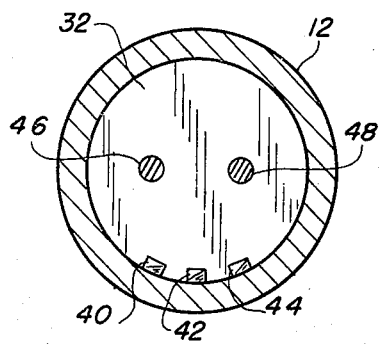
FIG. 4 is a horizontal cross-sectional view taken along the line 4—4 in FIG. 3.
Figure 3:
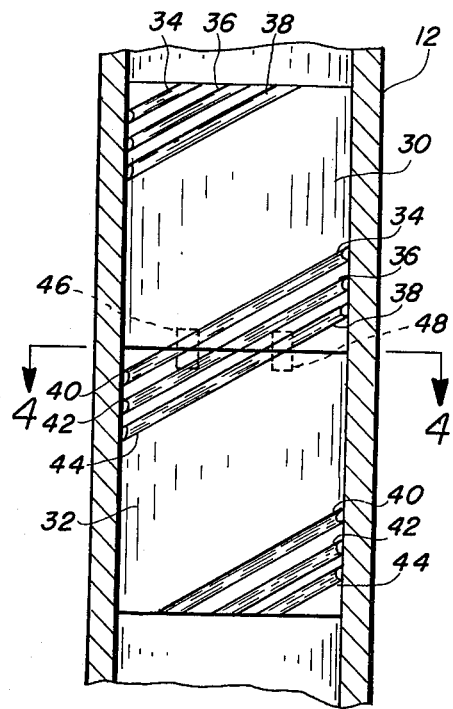
FIG. 3 is an elevation in partial section of a three-groove, two-segment shielding member within a sonde housing.

In a given case it may be required to pass more than one conductor and/or conduit by the shielding member. Then, multiple grooves may be provided as indicated in FIGS. 3 and 4. A shielding member is shown comprised of two submembers 30 and 32, and three grooves as follows: grooves 34, 36 and 38 in submember 30; and grooves 40, 42, and 44 in submember 32. The two submembers 30 and 32 are placed end-to-end, and aligned with pins 46 and 48 secured in appropriate recesses in the adjoining faces of the two submembers. The pins 46 and 48 facilitate, and maintain, the relative rotational alignment of one submember 30 with respect to the other submember 32. This ensures that the pairs of grooves 34 and 40, 36 and 42, 38 and 44 each form a continuous path about both shielding submembers.

As indicated hereinbefore with respect to FIGS. 1 and 2, the width and depth of the grooves 34, 36, 38, 40, 42, and 44 are determined by the thicknesses of the conductors or conduits to be placed therein respectively. The shielding members 30 and 32 are assembled with the pins 46 and 48 in place as shown, and the conductors and/or conduits are inserted in the grooves 34, 40 and 36, 42, and 38, 44. The shielding device, comprising the two submembers 30 and 32, is then positioned within the tubular sonde housing 12, with the inside surface of the housing enclosing the conductors and/or conduits within their respective grooves.

There are two possible conditions that warrant the construction of a shielding member in the form of two or more shielding submembers. When the length of the shielding member required is so large as to make it impractical to form the entire shield in one piece, two or more submembers of more convenient length may be constructed separately, then joined as in FIGS. 3 and 4. This problem may arise, for example, where the groove is beint cut into metal shielding material in cylindrical form on a milling machine; then, the length of the groove cut in one run on the machine is limited by the bed travel on the milling machine. Similarly, when more than one kind of shielding material is required, a shielding submember of appropriate length may be constructed of each of the shielding materials indicated, and the shielding submembers then joined together as noted hereinbefore.

A third consideration for constructing a shielding member of multiple shielding submembers exists — convenience. Different amounts of shielding may be called for in various applications; a plurality of shielding submembers may be constructed, and a single submember deployed as a shielding device, or multiple submembers joined together for greater shielding length as required.

In FIG. 3, the pitch of the grooves on each shielding submember 30 and 32 is equal to the length of the respective submember. Therefore, the overall groove pitch for the assembled shielding device comprising the two submembers 30 and 32 is equal to one-half of the length of the assembled shielding device. These pitch relative values may be varied to suit the intended application without deviating from the spirit of the invention. For example, the pitch of multiple shielding submembers to be assembled in a single shielding device may be increased so that the pitch of the grooves on the assembled shielding device is equal to the length of the assembled shielding device itself. This arrangement would retain the uniformity of peripheral shielding material amount discussed hereinbefore with respect to FIGS. 1 and 2.

While only right circular cylindrical shielding members with helical grooves, and sonde housing of circular interior cross section, are shown, it will be appreciated that any generally cylindrical shielding member, fitting with close tolerance inside a correspondingly shaped generally tubular housing, with one or more grooves running along the shielding device while circuiting its periphery so as to form correspondingly one or more continuous, non-linear paths for conductors and/or conduits from the area or cavity on one side of the shielding device to the area or cavity on the other side, may be provided without deviating from the invention.

The foregoing disclosure and description of the invention is illustrative and explanatory thereof, and various changes in the size, shape and materials as well as in the details of the illustrated construction may be made within the scope of the appended claims without departing from the spirit of the invention.

The embodiments of the invention in which an exclusive property or privilege is claimed are defined as follows:

1. A radiation shield, for use in well logging applications, comprising:
   a. a fluid tight tubular housing member or sonde sized and adapted for passage through a well borehole;
   b. a substantially cylindrical radiation shielding member having a length L and a radius R and closely fitted within said sonde;
   c. a first cavity within said sonde on one side of said substantially cylindrical shielding member;
   d. a second cavity within said sonde on the opposite side of said substantially cylindrical shielding member from said first cavity; and
   e. substantially helical groove means on the surface of said substantially cylindrical shielding member, having a pitch approximately equal to L and a depth D which is small relative to R and extending longitudinally along the external surface of said substantially cylindrical shielding member from said first cavity to said second cavity, and forming a non-linear pathway communicating said first cavity with said second cavity.

2. A radiation shield as defined in claim 1 wherein said substantially helical groove means further comprises a plurality of pathways, each having a pitch approximately equal to L and a depth D which is small relative to R and communicating said first cavity with said second cavity.

3. A radiation shield as defined in claim 1 wherein said substantially cylindrical shielding member further comprises a plurality of substantially cylindrical shielding submembers having a total length of L and arranged longitudinally along said sonde with said substantially helical groove means having a pitch approximately equal to L and a depth D which is small relative to R and extending longitudinally and continuously along the surface of all said substantially cylindrical shielding submembers from said first cavity to said second cavity.

4. A radiation shield as defined in claim 3 wherein said substantially helical groove means further comprises a plurality of pathways, each having a pitch approximately equal to L and communicating said first cavity with said second cavity.

5. A method of providing radiation shielding within a tubular well logging sonde, thereby forming a first and a second cavity within said sonde and on opposite sides of said radiation shielding, comprising:
   a. providing a shielding member in substantially cylindrical form having a radius R and a length L, and which closely fits within said tubular sonde; and
   b. providing at least one substantially helical groove having a pitch approximately equal to L and a depth D which is small relative to R and extending longitudinally along the surface of said substantially cylindrical shielding member, from said first cavity to said second cavity within said tubular sonde, and forming a communication pathway from said first cavity to said second cavity.

6. A method of providing radiation shielding as defined in claim 5 further comprising providing a plurality of such substantially helical grooves on the surface of said substantially cylindrical shielding member and substantially paralleling each other, each having a pitch approximately equal to L and depth D which is small relative to R and communicating said first cavity with said second cavity.

7. A method of providing radiation shielding as defined in claim 5 further comprising:
   a. providing a plurality of said shielding members, each in substantially cylindrical form, and each closely fitting within said tubular sonde;
   b. arranging said shielding members consecutively to form a substantially cylindrical member of total length L within said tubular sonde between said first cavity and second cavity; and
   c. providing said substantially helical groove having a pitch approximately equal to L continuously along the surfaces of all of said shielding members to communicate said first cavity with said second cavity.

8. A method of providing radiation shielding as defined in claim 7 further comprising providing a plurality of such said substantially helical grooves each having a pitch approximately equal to L on the surfaces of all of said substantially helical groove communicating said first cavity with said second cavity.

* * * * *